United States Patent
Zhao et al.

(10) Patent No.: US 9,952,594 B1
(45) Date of Patent: Apr. 24, 2018

(54) SYSTEM AND METHOD FOR TRAFFIC DATA COLLECTION USING UNMANNED AERIAL VEHICLES (UAVS)

(71) Applicant: TuSimple, San Diego, CA (US)

(72) Inventors: Yufei Zhao, San Diego, CA (US); Xiaodi Hou, San Diego, CA (US)

(73) Assignee: TUSIMPLE, San Diego, CA (US)

( * ) Notice: Subject to any disclaimer, the term of this patent is extended or adjusted under 35 U.S.C. 154(b) by 0 days.

(21) Appl. No.: 15/482,038

(22) Filed: Apr. 7, 2017

(51) Int. Cl.
*G05D 1/00* (2006.01)
*G05D 1/08* (2006.01)
(Continued)

(52) U.S. Cl.
CPC ......... *G05D 1/0094* (2013.01); *B64C 39/024* (2013.01); *B64D 47/08* (2013.01);
(Continued)

(58) Field of Classification Search
CPC .... G05D 1/0094; G05D 1/0808; G05D 1/101; G08G 1/012; B64C 39/024;
(Continued)

(56) References Cited

U.S. PATENT DOCUMENTS

| | | |
|---|---|---|
| 6,777,904 B1 | 8/2004 | Degner |
| 7,103,460 B1 | 9/2006 | Breed |

(Continued)

FOREIGN PATENT DOCUMENTS

| | | |
|---|---|---|
| EP | 1754179 A1 | 2/2007 |
| EP | 2448251 A2 | 5/2012 |

(Continued)

OTHER PUBLICATIONS

Spinello, Luciano, Triebel, Rudolph, Siegwart, Roland, "Multiclass Multimodal Detection and Tracking in Urban Environments", Sage Journals, vol. 29 issue: 12, pp. 1498-1515 Article first published online: Oct. 7, 2010;Issue published: Oct. 1, 2010.

(Continued)

*Primary Examiner* — Hussein Elchanti
(74) *Attorney, Agent, or Firm* — Inventive Patent Law P.C.; Jim H. Salter

(57) ABSTRACT

A system and method for traffic data collection using unmanned aerial vehicles (UAVs) are disclosed. A particular embodiment is configured to: deploy an unmanned aerial vehicle (UAV), equipped with a camera, to an elevated position at a monitored location or to track a specific target vehicle; capture video data of the monitored location or the target vehicle for a pre-determined period of time using the UAV camera; transfer the captured video data to a processing system; at the processing system, process the captured video data on a frame basis to identify vehicles or objects of interest for analysis; group the video data from multiple frames related to a particular vehicle or object of interest into a data group associated with the particular vehicle or object; create a data group for each of the vehicles or objects of interest; and provide the data groups corresponding to each of the vehicles or objects of interest as output data used to configure or train a human driver model for prediction or simulation of human driver behavior.

20 Claims, 9 Drawing Sheets

(51) Int. Cl.
*G05D 1/10* (2006.01)
*G08G 1/01* (2006.01)
*B64C 39/02* (2006.01)
*B64D 47/08* (2006.01)
*G06K 9/00* (2006.01)

(52) U.S. Cl.
CPC ........... *G05D 1/0808* (2013.01); *G05D 1/101* (2013.01); *G06K 9/00624* (2013.01); *G08G 1/012* (2013.01); *B64C 2201/127* (2013.01); *B64C 2201/141* (2013.01)

(58) Field of Classification Search
CPC ........ B64C 2201/127; B64C 2201/141; B64D 47/08; G06K 9/00624
See application file for complete search history.

(56) References Cited

U.S. PATENT DOCUMENTS

| | | | |
|---|---|---|---|
| 7,280,134 B1 * | 10/2007 | Henderson | B64D 11/0015 348/117 |
| 7,689,559 B2 | 3/2010 | Canright | |
| 7,783,403 B2 | 8/2010 | Breed | |
| 7,844,595 B2 | 11/2010 | Canright | |
| 8,041,111 B1 | 10/2011 | Wilensky | |
| 8,064,643 B2 | 11/2011 | Stein | |
| 8,082,101 B2 | 12/2011 | Stein | |
| 8,164,628 B2 | 4/2012 | Stein | |
| 8,175,376 B2 | 5/2012 | Marchesotti | |
| 8,271,871 B2 | 9/2012 | Marchesotti | |
| 8,378,851 B2 | 2/2013 | Stein | |
| 8,392,117 B2 | 3/2013 | Dolgov | |
| 8,401,292 B2 | 3/2013 | Park | |
| 8,412,449 B2 | 4/2013 | Trepagnier | |
| 8,478,072 B2 | 7/2013 | Aisaka | |
| 8,553,088 B2 | 10/2013 | Stein | |
| 8,788,134 B1 | 7/2014 | Litkouhi | |
| 8,908,041 B2 | 12/2014 | Stein | |
| 8,917,169 B2 | 12/2014 | Schofield | |
| 8,963,913 B2 | 2/2015 | Baek | |
| 8,965,621 B1 | 2/2015 | Urmson | |
| 8,981,966 B2 | 3/2015 | Stein | |
| 8,993,951 B2 | 3/2015 | Schofield | |
| 9,002,632 B1 | 4/2015 | Emigh | |
| 9,008,369 B2 | 4/2015 | Schofield | |
| 9,025,880 B2 | 5/2015 | Perazzi | |
| 9,042,648 B2 | 5/2015 | Wang | |
| 9,111,444 B2 | 8/2015 | Kaganovich | |
| 9,117,133 B2 | 8/2015 | Barnes | |
| 9,118,816 B2 | 8/2015 | Stein | |
| 9,120,485 B1 | 9/2015 | Dolgov | |
| 9,122,954 B2 | 9/2015 | Srebnik | |
| 9,134,402 B2 | 9/2015 | Sebastian | |
| 9,145,116 B2 | 9/2015 | Clarke | |
| 9,147,255 B1 | 9/2015 | Zhang | |
| 9,156,473 B2 | 10/2015 | Clarke | |
| 9,176,006 B2 | 11/2015 | Stein | |
| 9,179,072 B2 | 11/2015 | Stein | |
| 9,183,447 B1 | 11/2015 | Gdalyahu | |
| 9,185,360 B2 | 11/2015 | Stein | |
| 9,191,634 B2 | 11/2015 | Schofield | |
| 9,233,659 B2 | 1/2016 | Rosenbaum | |
| 9,233,688 B2 | 1/2016 | Clarke | |
| 9,248,832 B2 | 2/2016 | Huberman | |
| 9,248,835 B2 | 2/2016 | Tanzmeister | |
| 9,251,708 B2 | 2/2016 | Rosenbaum | |
| 9,277,132 B2 | 3/2016 | Berberian | |
| 9,280,711 B2 | 3/2016 | Stein | |
| 9,286,522 B2 | 3/2016 | Stein | |
| 9,297,641 B2 | 3/2016 | Stein | |
| 9,299,004 B2 | 3/2016 | Lin | |
| 9,315,192 B1 | 4/2016 | Zhu | |
| 9,317,033 B2 | 4/2016 | Ibanez-Guzman | |
| 9,317,776 B1 | 4/2016 | Honda | |
| 9,330,334 B2 | 5/2016 | Lin | |
| 9,342,074 B2 | 5/2016 | Dolgov | |
| 9,355,635 B2 | 5/2016 | Gao | |
| 9,365,214 B2 | 6/2016 | Ben Shalom | |
| 9,399,397 B2 | 7/2016 | Mizutani | |
| 9,428,192 B2 | 8/2016 | Schofield | |
| 9,436,880 B2 | 9/2016 | Bos | |
| 9,438,878 B2 | 9/2016 | Niebla | |
| 9,443,163 B2 | 9/2016 | Springer | |
| 9,446,765 B2 | 9/2016 | Ben Shalom | |
| 9,459,515 B2 | 10/2016 | Stein | |
| 9,466,006 B2 | 10/2016 | Duan | |
| 9,476,970 B1 | 10/2016 | Fairfield | |
| 9,490,064 B2 | 11/2016 | Hirosawa | |
| 9,531,966 B2 | 12/2016 | Stein | |
| 9,535,423 B1 | 1/2017 | Debreczeni | |
| 9,555,803 B2 | 1/2017 | Pawlicki | |
| 9,568,915 B1 | 2/2017 | Bemtorp | |
| 9,587,952 B1 | 3/2017 | Slusar | |
| 9,720,418 B2 | 8/2017 | Stenneth | |
| 9,723,097 B2 | 8/2017 | Harris | |
| 9,723,099 B2 | 8/2017 | Chen | |
| 9,738,280 B2 | 8/2017 | Rayes | |
| 9,746,550 B2 | 8/2017 | Nath | |
| 9,805,273 B1 * | 10/2017 | Seeber | G06K 9/00771 |
| 2004/0173726 A1 * | 9/2004 | Mercadal | F16M 11/10 248/660 |
| 2007/0230792 A1 | 10/2007 | Shashua | |
| 2008/0215204 A1 * | 9/2008 | Roy | G05D 1/0044 701/28 |
| 2008/0249667 A1 | 10/2008 | Horvitz | |
| 2009/0040054 A1 | 2/2009 | Wang | |
| 2009/0125223 A1 * | 5/2009 | Higgins | G06T 7/246 701/532 |
| 2010/0049397 A1 | 2/2010 | Lin | |
| 2010/0226564 A1 | 9/2010 | Marchesotti | |
| 2010/0281361 A1 | 11/2010 | Marchesotti | |
| 2011/0206282 A1 | 8/2011 | Aisaka | |
| 2012/0105639 A1 | 5/2012 | Stein | |
| 2012/0140076 A1 | 6/2012 | Rosenbaum | |
| 2012/0274629 A1 | 11/2012 | Baek | |
| 2014/0145516 A1 | 5/2014 | Hirosawa | |
| 2014/0198184 A1 | 7/2014 | Stein | |
| 2015/0062304 A1 | 3/2015 | Stein | |
| 2015/0353082 A1 | 12/2015 | Lee | |
| 2016/0037064 A1 | 2/2016 | Stein | |
| 2016/0039534 A1 * | 2/2016 | Agrawal | G06K 9/00785 348/144 |
| 2016/0094774 A1 | 3/2016 | Li | |
| 2016/0129907 A1 | 5/2016 | Kim | |
| 2016/0165157 A1 | 6/2016 | Stein | |
| 2016/0210528 A1 | 7/2016 | Duan | |
| 2016/0321381 A1 | 11/2016 | English | |
| 2016/0375907 A1 | 12/2016 | Erban | |
| 2017/0053169 A1 * | 2/2017 | Cuban | H04N 7/185 |
| 2017/0076616 A1 * | 3/2017 | Kanade | G08G 5/045 |
| 2017/0134906 A1 * | 5/2017 | Yoo | H04W 4/027 |
| 2017/0195627 A1 * | 7/2017 | Sham | H04N 7/147 |
| 2017/0287295 A1 * | 10/2017 | Aswath | B64C 39/02 |

FOREIGN PATENT DOCUMENTS

| | | |
|---|---|---|
| EP | 2463843 A2 | 6/2012 |
| EP | 2463843 A3 | 7/2013 |
| EP | 2761249 A1 | 8/2014 |
| EP | 2463843 B1 | 7/2015 |
| EP | 2448251 A3 | 10/2015 |
| EP | 2946336 A2 | 11/2015 |
| EP | 2993654 A1 | 3/2016 |
| EP | 3081419 A1 | 10/2016 |
| WO | WO/2005/098739 A1 | 10/2005 |
| WO | WO/2005/098751 A1 | 10/2005 |
| WO | WO/2005/098782 | 10/2005 |
| WO | WO/2010/109419 A1 | 9/2010 |
| WO | WO/2013/045612 | 4/2013 |
| WO | WO/2014/111814 A2 | 7/2014 |
| WO | WO/2014/111814 A3 | 7/2014 |
| WO | WO/2014/201324 | 12/2014 |

(56) References Cited

FOREIGN PATENT DOCUMENTS

| WO | WO/2015/083009 | | 6/2015 |
|---|---|---|---|
| WO | WO/2015/103159 | A1 | 7/2015 |
| WO | WO/2015/125022 | | 8/2015 |
| WO | WO/2015/186002 | A2 | 12/2015 |
| WO | WO/2015/186002 | A3 | 12/2015 |
| WO | WO/2016/135736 | | 9/2016 |
| WO | WO/2017/013875 | A1 | 1/2017 |

OTHER PUBLICATIONS

Ramos, Sebastian, Gehrig, Stefan, Pinggera, Peter, Franke, Uwe, Rather, Carsten, "Detecting Unexpected Obstacles for Self-Driving Cars: Fusing Deep Learning and Geometric Modeling", arXiv:1612.06573v1 [cs.CV] Dec. 20, 2016.

Schroff, Florian, Dmitry Kalenichenko, James Philbin, (Google), "FaceNet: A Unified Embedding for Face Recognition and Clustering", CVPR 2015.

Dai, Jifeng, Kaiming He, Jian Sun, (Microsoft Research), "Instance-aware Semantic Segmentation via Multi-task Network Cascades", CVPR 2016.

Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO] Apr. 17, 2015.

Jain, Suyong Dutt, Grauman, Kristen, "Active Image Segmentation Propagation", In Proceedings of the IEEE Conference on Computer Vision and Pattern Recognition (CVPR), Las Vegas, Jun. 2016.

MacAodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), 2014.

Kendall, Alex, Gal, Yarin, "What Uncertainties Do We Need in Bayesian Deep Learning for Computer Vision", arXiv:1703.04977v1 [cs.CV] Mar. 15, 2017.

Wei, Junqing, John M. Dolan, Bakhtiar Litkhouhi, "A Prediction- and Cost Function-Based Algorithm for Robust Autonomous Freeway Driving", 2010 IEEE Intelligent Vehicles Symposium, University of California, San Diego, CA, USA, Jun. 21-24, 2010.

Peter Welinder, Steve Branson, Serge Belongie, Pietro Perona, "The Multidimensional Wisdom of Crowds"; http://www.vision.caltech.edu/visipedia/papers/WelinderEtalNIPS10.pdf, 2010.

Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611.09580v1 [cs.CV] Nov. 29, 2016.

P. Guarneri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.

C. Yang, Z. Li, R. Cui and B. Xu, "Neural Network-Based Motion Control of an Underactuated Wheeled Inverted Pendulum Model;" in IEEE Transactions on Neural Networks and Learning Systems, vol. 25, No. 11, pp. 2004-2016, Nov. 2014.

Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, 2016.

Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, Mar. 2007.

Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada, 2016.

Adam Paszke, Abhishek Chaurasia, Sangpil Kim, and Eugenio Culurciello. Enet: A deep neural network architecture for real-time semantic segmentation. CoRR, abs/1606.02147, 2016.

Hou, Xiaodi and Zhang, Liqing, "Saliency Detection: A Spectral Residual Approach", Computer Vision and Pattern Recognition, CVPR'07—IEEE Conference, pp. 1-8, 2007.

Hou, Xiaodi and Hare!, Jonathan and Koch, Christof, "Image Signature: Highlighting Sparse Salient Regions", IEEE Transactions on Pattern Analysis and Machine Intelligence, vol. 34, No. 1, pp. 194-201, 2012.

Hou, Xiaodi and Zhang, Liqing, "Dynamic Visual Attention: Searching for Coding Length Increments", Advances in Neural Information Processing Systems, vol. 21, pp. 681-688, 2008.

Li, Yin and Hou, Xiaodi and Koch, Christof and Rehg, James M. and Yuille, Alan L., "The Secrets of Salient Object Segmentation", Proceedings of the IEEE Conference on Computer Vision and Pattern Recognition, pp. 280-287, 2014.

Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.

Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.

Hou, Xiaodi and Zhang, Liqing, "Color Conceptualization", Proceedings of the 15th ACM International Conference on Multimedia, pp. 265-268, ACM, 2007.

Hou, Xiaodi and Zhang, Liqing, "Thumbnail Generation Based on Global Saliency", Advances in Cognitive Neurodynamics, ICCN 2007, pp. 999-1003, Springer Netherlands, 2008.

Hou, Xiaodi and Yuille, Alan and Koch, Christof, "A Meta-Theory of Boundary Detection Benchmarks", arXiv preprint arXiv:1302.5985, 2013.

Li, Yanghao and Wang, Naiyan and Shi, Jianping and Liu, Jiaying and Hou, Xiaodi, "Revisiting Batch Normalization for Practical Domain Adaptation", arXiv preprint arXiv:1603.04779, 2016.

Li, Yanghao and Wang, Naiyan and Liu, Jiaying and Hou, Xiaodi, "Demystifying Neural Style Transfer", arXiv preprint arXiv:1701.01036, 2017.

Hou, Xiaodi and Zhang, Liqing, "A Time-Dependent Model of Information Capacity of Visual Attention", International Conference on Neural Information Processing, pp. 127-136, Springer Berlin Heidelberg, 2006.

Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, 2017.

Li, Yanghao and Wang, Naiyan and Liu, Jiaying and Hou, Xiaodi, "Factorized Bilinear Models for Image Recognition", arXiv preprint arXiv:1611.05709, 2016.

Hou, Xiaodi, "Computational Modeling and Psychophysics in Low and Mid-Level Vision", California Institute of Technology, 2014.

\* cited by examiner

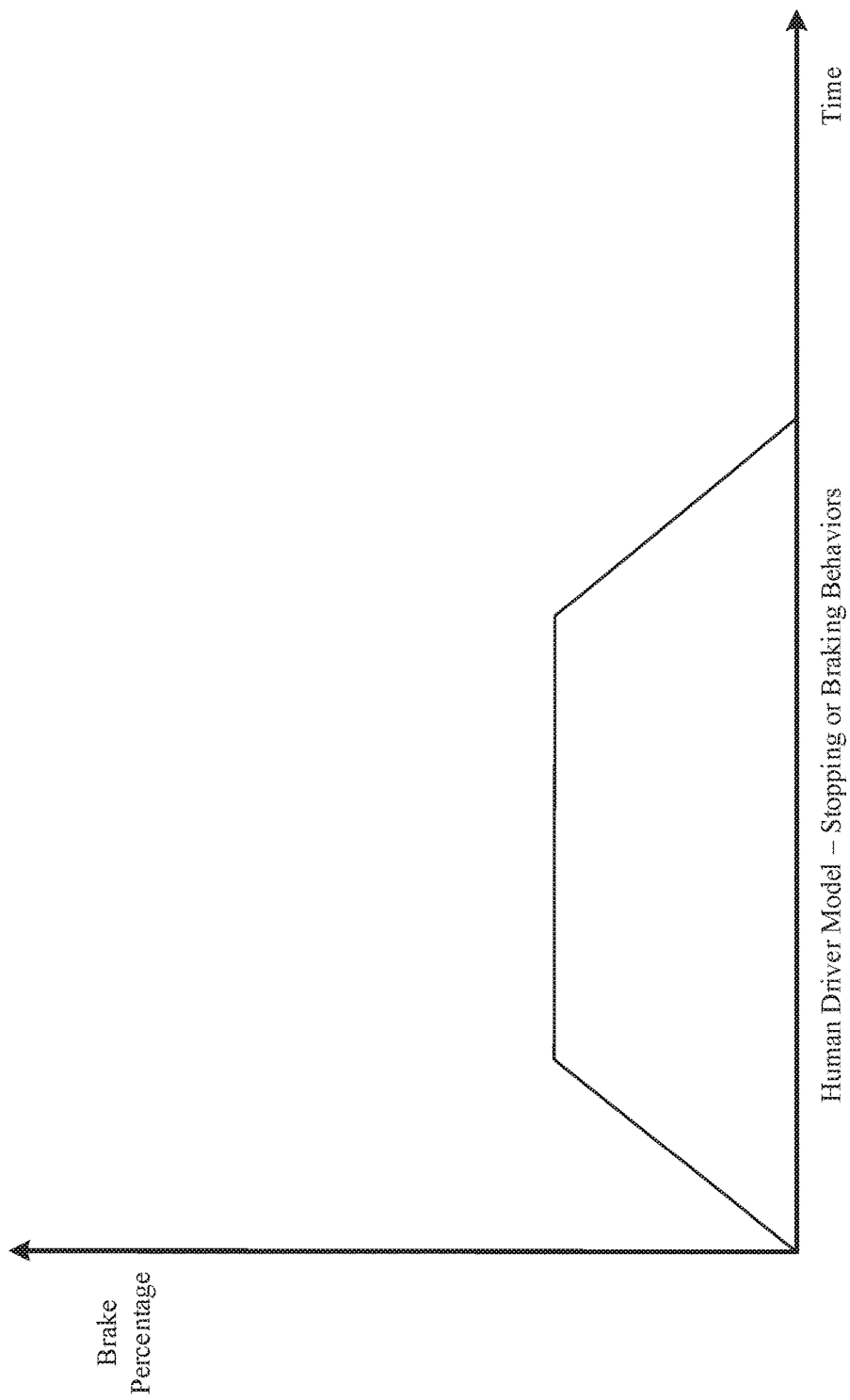

SYSTEM AND METHOD FOR TRAFFIC DATA COLLECTION USING UNMANNED AERIAL VEHICLES (UAVS)

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2016-2017, TuSimple, All Rights Reserved.

TECHNICAL FIELD

This patent document pertains generally to tools (systems, apparatuses, methodologies, computer program products, etc.) for human driver modeling, trajectory generation and motion planning, vehicle control systems, and autonomous driving systems, and more particularly, but not by way of limitation, to a system and method for traffic data collection using unmanned aerial vehicles (UAVs).

BACKGROUND

Autonomous vehicles include a control system configured to receive sensory data corresponding to a driving environment from a number of information gathering devices or sensors. The information gathering devices or sensors may include light amplification by stimulated emission of radiation (laser), sound navigation and ranging (sonar), radio detection and ranging (radar), light detection and ranging (LIDAR), etc. Many autonomous vehicles have also been equipped with commercial cameras to gather information and images from the driving environment. In conventional autonomous vehicles or related probe vehicles, the cameras are mounted in a fixed position and/or orientation, which can cause image occlusion and unreliable image reconstruction accuracy. Because of the image occlusion and unreliable image reconstruction, vehicles or objects in the driving environment represented in the images may be obscured or lost.

The control system of autonomous vehicles can sometimes be configured using a simulated human driver environment. The simulated human driver environment attempts to model the typical driving behavior of human drivers in various driving environments. However, the simulated human driver environment may be built based on the information gathered from the sensors and cameras on the autonomous vehicle or related probe vehicles. Because this information, including images from the vehicle cameras, can be subject to image occlusion and unreliable image reconstruction accuracy, the utility and effectiveness of the simulated human driver environment is degraded. As a result, the effectiveness of the control systems of autonomous vehicles is also compromised.

SUMMARY

A system and method for traffic data collection using unmanned aerial vehicles (UAVs) is disclosed herein. Specifically, the system and method of an example embodiment provides traffic data collection using modern UAVs, which create a bird's-eye (elevated) view and provide accurate data related to traffic activity in view of the UAV. Modern UAVs are able to hover or move in the sky at an elevated position to collect data concerning a location or a particular vehicle, with a high level of stability regardless of weather conditions that may be inappropriate for data collection. With a high definition and stabilized camera configured on a UAV, data with unprecedented high quality can be collected. The data collected reflects truly realistic real-world traffic information related to the location or vehicle being monitored. Additionally, the UAVs' presence does not interfere with the traffic activity the UAV is viewing, which is in contrast to most data collection methods currently in practice. Further, data collection using UAVs eliminates occlusion problems caused by obstructions in the camera's field of view. The lack of occlusion is crucial for the efficient and high fidelity image data processing performed after the data is collected. Finally, average inexpensive consumer UAVs are sufficient to fulfill most image data collection tasks.

BRIEF DESCRIPTION OF THE DRAWINGS

The various embodiments are illustrated by way of example, and not by way of limitation, in the figures of the accompanying drawings in which:

FIGS. 2 through 4 illustrate example driving scenarios showing the types of typical and atypical driving behaviors modeled by a human driver model module of an example embodiment;

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

Figure 1:
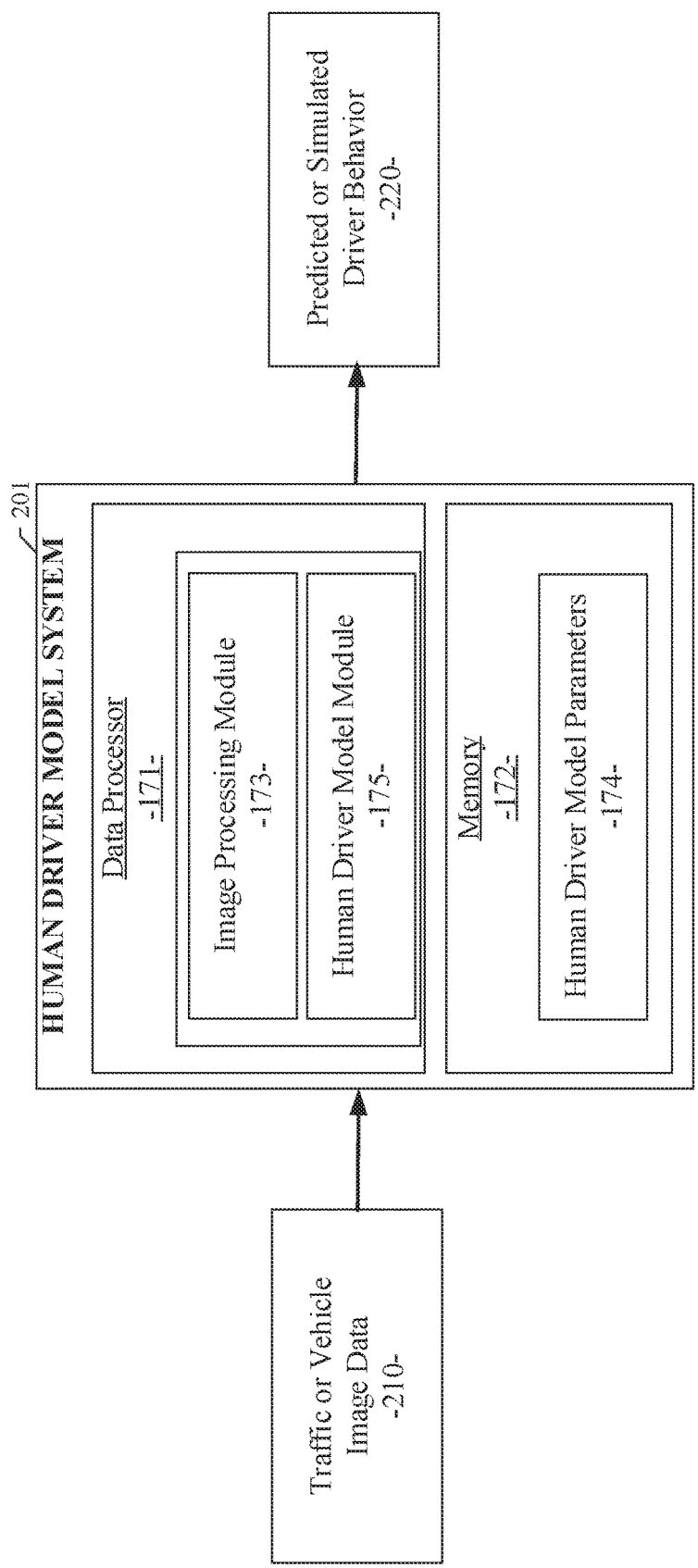
FIG. 1 illustrates the components of a human driver model system of an example embodiment.

As described in various example embodiments, a system and method for traffic data collection using unmanned aerial vehicles (UAVs) are described herein. Referring to FIG. 1, an example embodiment disclosed herein can be used in the context of a human driver model system 201 for autonomous vehicles. In one example embodiment, the human driver model system 201 can receive high definition image data and other sensor data (e.g., traffic or vehicle image data 210) from a UAV positioned above a particular roadway (e.g., monitored location) or target vehicle being monitored. The image data collected by the UAV reflects truly realistic, real-world traffic information related to the location or target vehicle being monitored. Using the standard capabilities of well-known UAV's, the traffic or vehicle image data 210 can be wirelessly transferred to a data processor 171 of a standard computing system, upon which a human driver model module 175 and/or an image processing module 173 can be executed. Alternatively, the traffic or vehicle image data 210 can be stored in a memory device on the UAV and transferred later to the data processor 171. The processing performed by the human driver model module 175 of an example embodiment is described in more detail below. The traffic or vehicle image data 210 provided by the deployed UAV can be received and processed by the image processing module 173, which can also be executed by the data processor 171. The image processing module 173 can perform filtering, object segmentation, object classification, and other image processing functions to isolate vehicle or object presence and activity in the received images. The human driver model module 175 can use the information related to these real-world vehicle or objects to create corresponding simulations of vehicle or objects in the human driver model. Parameter values retained in a human driver model parameter dataset 174 stored in a memory 172 can be used to configure the operation of the human driver model module 175. As described in more detail below, the elevated position of the UAV above the location or target vehicle being monitored and the stabilized high definition camera on the UAV provides a highly valuable and useful image and data feed for use by the human driver model module 175. As a result of the processing performed by the human driver model system 201, data corresponding to predicted or simulated driver behaviors 220 can be produced and provided to a user or other system components. In particular, the predicted or simulated driver behavior data 220 can be provided to a system component used to create a virtual world where a control system for an autonomous vehicle can be trained and improved. The virtual world is configured to be identical (as possible) to the real world where vehicles are operated by human drivers. In other words, the simulated driver behavior data is indirectly useful for configuring the control system for the autonomous vehicle. It will be apparent to those of ordinary skill in the art that the human driver model system 201 and the traffic or vehicle image data 210 described and claimed herein can be implemented, configured, processed, and used in a variety of other applications and systems as well.

A basic human driver model may be used to simulate or predict the behavior of an autonomous vehicle with a simulated driver in a simulation scenario. The basic human driver model represents a virtual world configured to be identical (as possible) to the real world where vehicles are operated by human drivers. The virtual world can be used to train and improve a control system for an autonomous vehicle. Thus, the simulation can be indirectly useful for configuring the control systems in autonomous vehicles. Such human driver models can be parameterized models, which may be configured using either real-world input or randomized variables. In one example, the basic human driver model may simulate the typical and atypical driver behaviors, such as steering or heading control, speed or throttle control, and stopping or brake control. In one example, the basic human driver model may use, for example, sensory-motor transport delay, dynamic capabilities, and preferred driving behaviors. In some implementations, the human driver model may include modeling of the transport time delay between a stimulus and the simulated driver's control response. In some implementations, this delay may represent the time necessary for the driver to sense a stimulus, process it, determine the best corrective action, and respond. The human driver model may also include a speed control model with an absolute maximum vehicle speed (e.g., the maximum speed of the vehicle, the speed a driver is not comfortable exceeding, etc.) and a cornering aggressiveness measure to reduce the speed based on the turning radius. In the example, this may replicate the tendency of drivers to slow down through a turn. In the example, once the turning radius drops below the cornering threshold in the scenario, the speed may be reduced in proportion to the tightness of the turn.

In various example embodiments, the human driver model can be configured to simulate more than the typical driving behaviors. To simulate an environment that is identical to the real world as much as possible, the human driver model needs data concerning typical driving behaviors, which represent average people, while atypical driving behaviors are equally needed. In other words, in reality, most human drivers drive vehicles in a pleasant and humble way, while other drivers drive aggressively and impatiently. Equivalently, the simulation system of the various example embodiments includes data related to the driving behaviors of impolite and impatient drivers in the virtual world. In all, the human driver model can be configured with data representing driving behaviors as varied as possible.

In some implementations, the dynamics of how a human may respond to stimuli may be included in the human driver model, which may include, for example, a metric of how aggressively the driver brakes and accelerates. In some implementations, an aggressive driver may be modeled as one who applies very high control inputs to achieve the desired vehicle speeds, while a conservative driver may use more gradual control inputs. In some implementations, this may be modelled using parameterized values, with the input being controlled to the desired value. In some implementations, by adjusting the parameterized values, the aggressiveness of the simulated driver may be increased or decreased.

Figure 2:
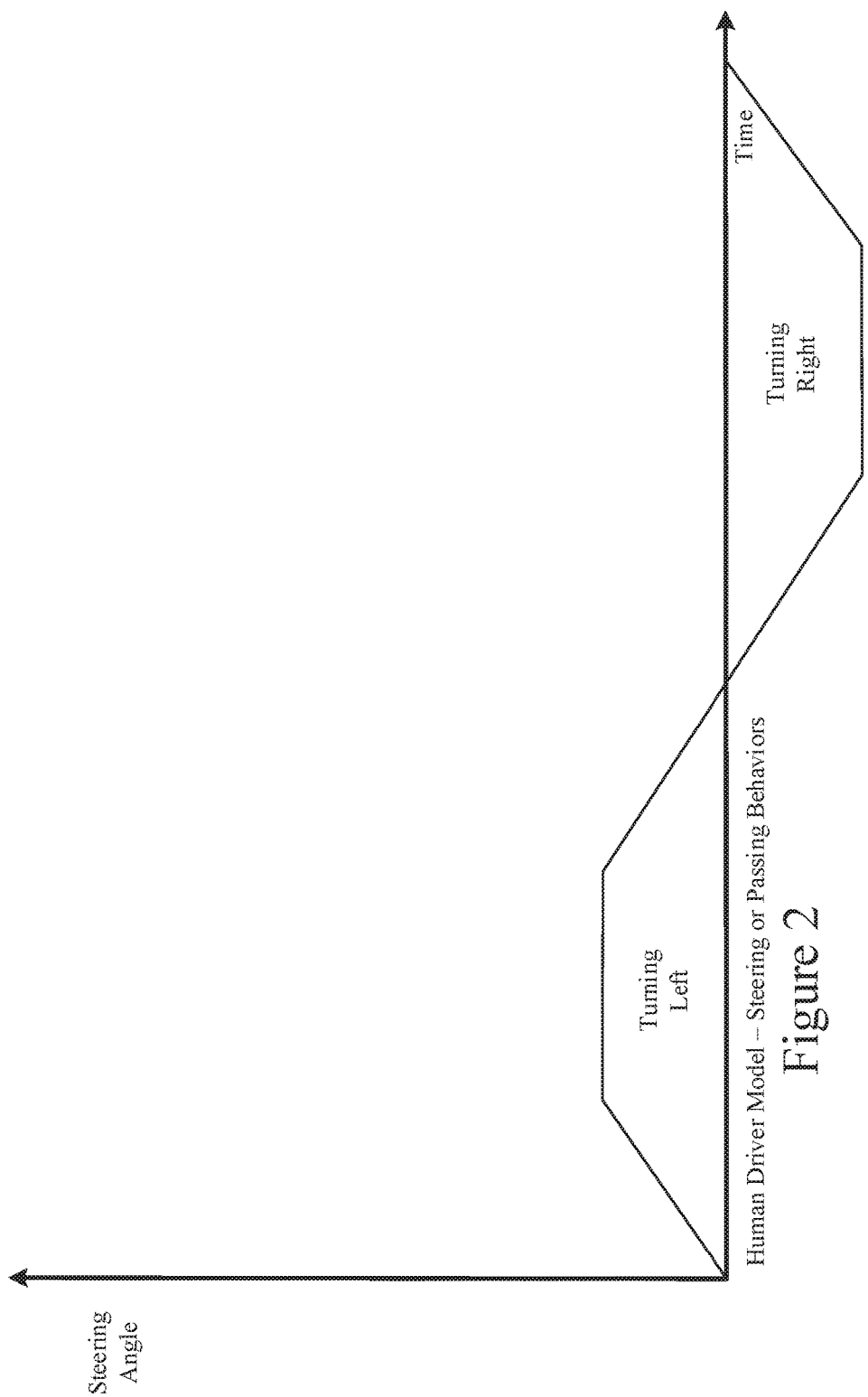
Figure 3:
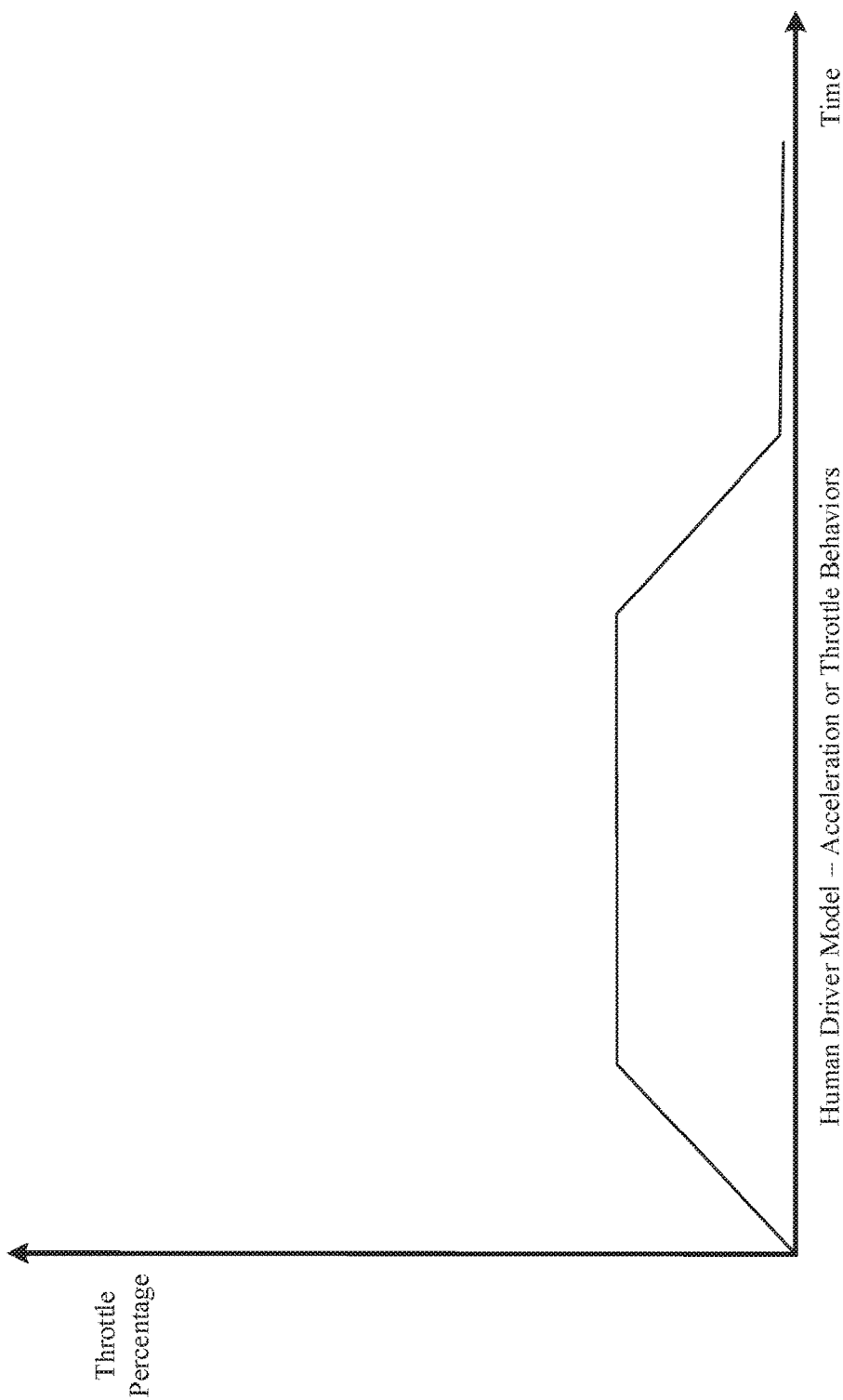

Referring now to FIGS. 2 through 4, example driving scenarios illustrate the types of driving behaviors modeled by the human driver model module 175 of an example embodiment based on the processed image data provided by the UAV. The example embodiment uses the actual real-world image data captured by a deployed UAV to model typical and atypical driving behaviors. This real-world image data is captured by the UAV and used by human driver model module 175 to encode data corresponding to these typical and atypical driving behaviors as mathematical or data representations. The data can be encoded as a neural network, rules sets, or other well-known methods for developing machine learning systems. The real-world image data can be captured for a monitored location, a single vehicle, and/or aggregated from data collected from a large population of vehicles and drivers. Over time, the human driver model module 175 can learn typical and atypical driving behaviors, retain driving behaviors deemed safe, and expunge behaviors deemed unsafe or residing outside common operational thresholds.

Referring to FIG. 2, an example illustrates a common driving behavior related to steering an autonomous vehicle and/or passing an obstacle (e.g., another vehicle) in the roadway. As shown in FIG. 2, the human driver model module 175 can receive real-world image data related to driving behaviors that correspond to a steering angle applied to the steering controls of the vehicle as a function of time. On the left side portion of the diagram in FIG. 2, a left side steering angle for a period of time indicates a leftward steering motion as typical when a vehicle passes an obstacle on the left. The slope of the steering angle indicates the typical rate of turn for this type of driving behavior. Abrupt, swerving, or unsafe turn rates, indicated by steep steering angle slopes, can be detected and expunged from the human driver model. In a corresponding fashion, the right side portion of the diagram in FIG. 2 shows a right side steering angle for a period of time indicating a rightward steering motion as typical when a vehicle passes an obstacle on the right. Typically, when a vehicle is driven by human drivers and the driver performs a left-side or right-side passing maneuver, the relationship between the steering angle and time can be learned and retained as a smooth data curve and a corresponding function by the human driver model module 175. As such, data corresponding to these steering and passing behaviors can be received, retained as a mathematical or data representation, and learned by the human driver model module 175 of an example embodiment.

Referring to FIG. 3, an example illustrates a common driving behavior related to accelerating or decelerating an autonomous vehicle and/or managing the speed of the vehicle. As shown in FIG. 3, the human driver model module 175 can receive real-world image data related to driving behaviors that correspond to a throttle level or throttle percentage applied to the engine or drivetrain controls of the vehicle as a function of time. On the left side portion of the diagram in FIG. 3, an initial increase in the throttle percentage for a period of time indicates an accelerating or vehicle speed increase behavior as typical when a vehicle passes an obstacle, such as another vehicle on the roadway. The slope of the throttle percentage indicates the typical rate of acceleration for this type of driving behavior. Abrupt or unsafe acceleration rates, indicated by steep throttle percentage slopes, can be detected and expunged from the human driver model. In a corresponding fashion, the right side portion of the diagram in FIG. 3 shows a decelerating throttle percentage for a period of time indicating a decelerating action or a vehicle speed decrease behavior. Typically, when a vehicle is driven by human drivers and the driver performs an acceleration or deceleration maneuver, the relationship between the throttle percentage and time can be learned and retained as a smooth data curve and a corresponding function by the human driver model module 175. As such, data corresponding to these acceleration or deceleration behaviors can be received, retained as a mathematical or data representation, and learned by the human driver model module 175 of an example embodiment.

Referring to FIG. 4, an example illustrates a common driving behavior related to braking or stopping an autonomous vehicle and/or managing the speed of the vehicle. As shown in FIG. 4, the human driver model module 175 can receive real-world image data related to driving behaviors that correspond to a braking level or braking percentage applied to the braking controls of the vehicle as a function of time. On the left side portion of the diagram in FIG. 4, an initial increase in the braking percentage for a period of time indicates a vehicle stopping behavior as typical when a driver depresses the brake pedal. The slope of the braking percentage indicates the typical rate of braking for this type of driving behavior. Abrupt or unsafe braking rates, indicated by steep braking percentage slopes, can be detected and expunged from the human driver model. In a corresponding fashion, the right side portion of the diagram in FIG. 4 shows a reduced or decreasing braking percentage for a period of time indicating a reduced vehicle braking behavior. Typically, when a vehicle is driven by human drivers and the driver performs a braking maneuver, the relationship between the braking percentage and time can be learned and retained as a smooth data curve and a corresponding function by the human driver model module 175. As such, data corresponding to these braking behaviors can be received, retained as a mathematical or data representation, and learned by the human driver model module 175 of an example embodiment.

Referring now to FIGS. 5 through 8, the system and method of an example embodiment provides traffic data collection using modern UAVs, which create a bird's-eye (elevated) view and provide accurate data related to traffic activity in view of the UAV. Modern UAVs are able to hover or move in the sky at an elevated position to collect data related to a location or a target vehicle, with a high degree of stability regardless of weather conditions that may be inappropriate for data collection. With a high definition and stabilized camera configured on a UAV, data with unprecedented high quality can be collected. The data collected reflects truly realistic real-world traffic information related to the location or target vehicle being monitored. Additionally, the UAVs' presence does not interfere with the traffic activity the UAV is viewing, which is in contrast to any data collection method currently in practice. Further, data collection using UAVs eliminates occlusion problems caused by obstructions in the camera's field of view. The lack of occlusion is crucial for the efficient and high fidelity image data processing performed after the data is collected. Finally, average inexpensive consumer UAVs are sufficient to fulfill most image data collection tasks.

Figure 5:
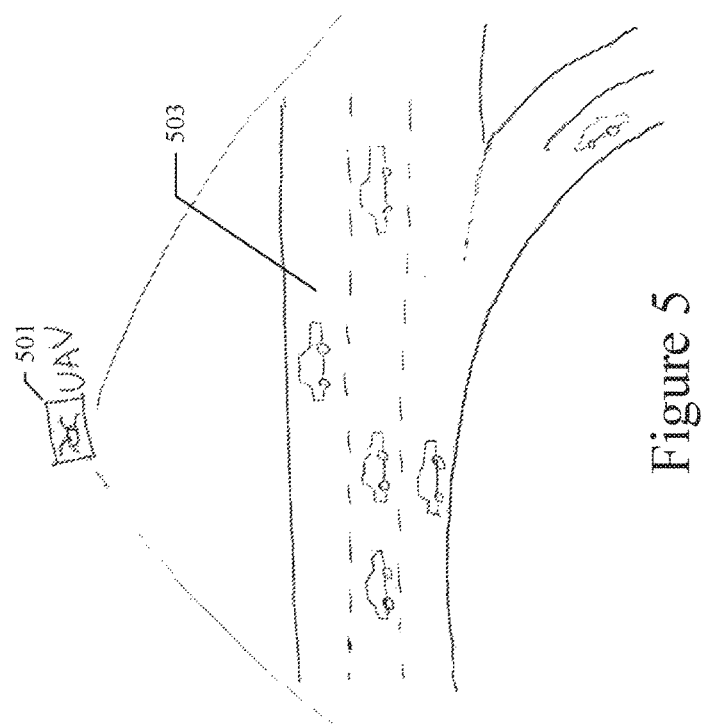
FIG. 5 illustrates a first example scenario wherein a UAV is configured with a camera and positioned at a certain location to be monitored at an elevated position to record video of the traffic activity at the location within the UAV's field of vision.

Referring now to FIG. 5, a first example scenario is illustrated wherein a UAV 501 is configured with a camera and positioned at a certain location 503 to be monitored at an elevated position to record video of the traffic activity at the location 503 within the UAV's field of vision. As shown, the UAV 501 can collect unobstructed video or image data from the monitored location 503. As a result, the collected video data can include images of vehicles or other objects in the field of view over a pre-determined time period. The activity and behavior of the vehicles and objects at the location 503 can thereby be recorded and later analyzed and processed for inclusion into the human driver model.

Figure 6:
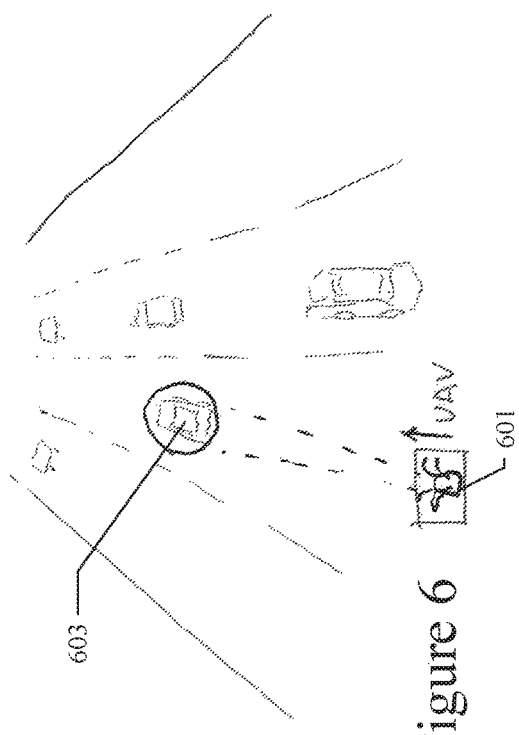
FIG. 6 illustrates an example scenario where a UAV is controlled to follow a particular target vehicle to record video image data regarding the activity of the target vehicle.

FIG. 6 illustrates an example scenario where a UAV 601 is controlled to track and follow a particular target vehicle 603 to record video image data regarding the activity of the target vehicle 603. Again, the UAV 601 can collect unobstructed video or image data of the monitored vehicle 603 because of the elevated position of the UAV 601. As a result, the collected video data can include images of the activity of the target vehicle 603 over a pre-determined time period. The activity and behavior of the target vehicle 603 can thereby be recorded and later analyzed and processed for inclusion into the human driver model.

Figure 8:
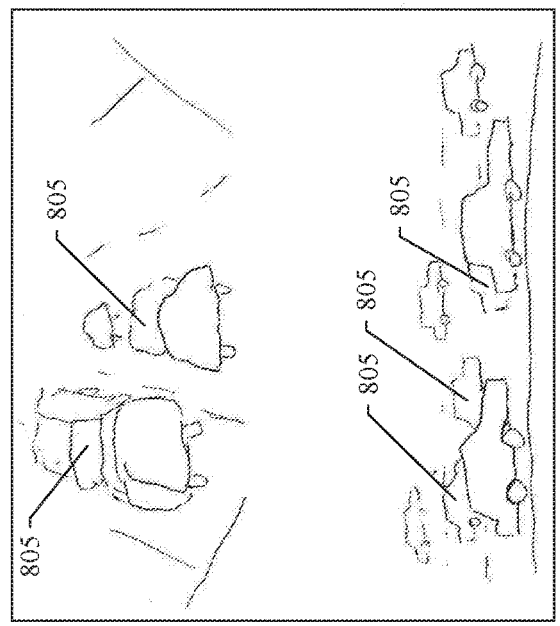
FIG. 8 illustrates the occluded images collected from cameras mounted on a probe vehicle or mounted at a fixed ground-based location.
Figure 7:
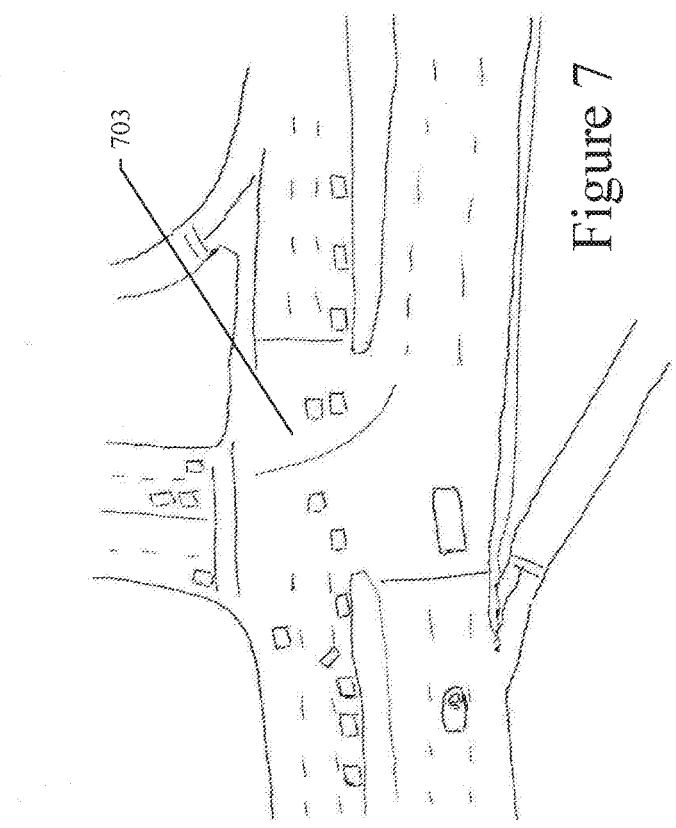
FIG. 7 illustrates another example scenario wherein a UAV is configured with a camera and positioned at a certain location at an elevated position to record video of the traffic activity at the location within the UAV's field of vision.

FIG. 7 illustrates another example scenario wherein a UAV is configured with a camera and positioned at a certain location 703 at an elevated position to record video of the traffic activity at the location 703 within the UAV's field of vision. As shown, the video captured by the UAV is unobstructed and provides a consistently clear aerial view of the monitored location 703. In contrast, FIG. 8 illustrates occluded images collected from cameras mounted on a probe vehicle. As shown in FIG. 8, the captured images show vehicles 805 that are partially or wholly obscured by other vehicles or objects at the location. This occlusion of the vehicles in the images prevents the accurate and complete analysis of the activity of each of the vehicles or objects in the captured images. In contrast to cameras mounted on a probe vehicle, the image data collected by the elevated UAV at the monitored location 703 as shown in FIG. 7 is not obscured and provides more accurate and more useful data for the human driver model. The elevated position of the UAV enables better video capture, which results in better modeling and simulation. Additionally, the use of UAVs can be done with less expense and without interference with the environment as compared with the traditional systems where cameras are mounted on a probe vehicle or mounted at a fixed ground-based location.

Figure 9:
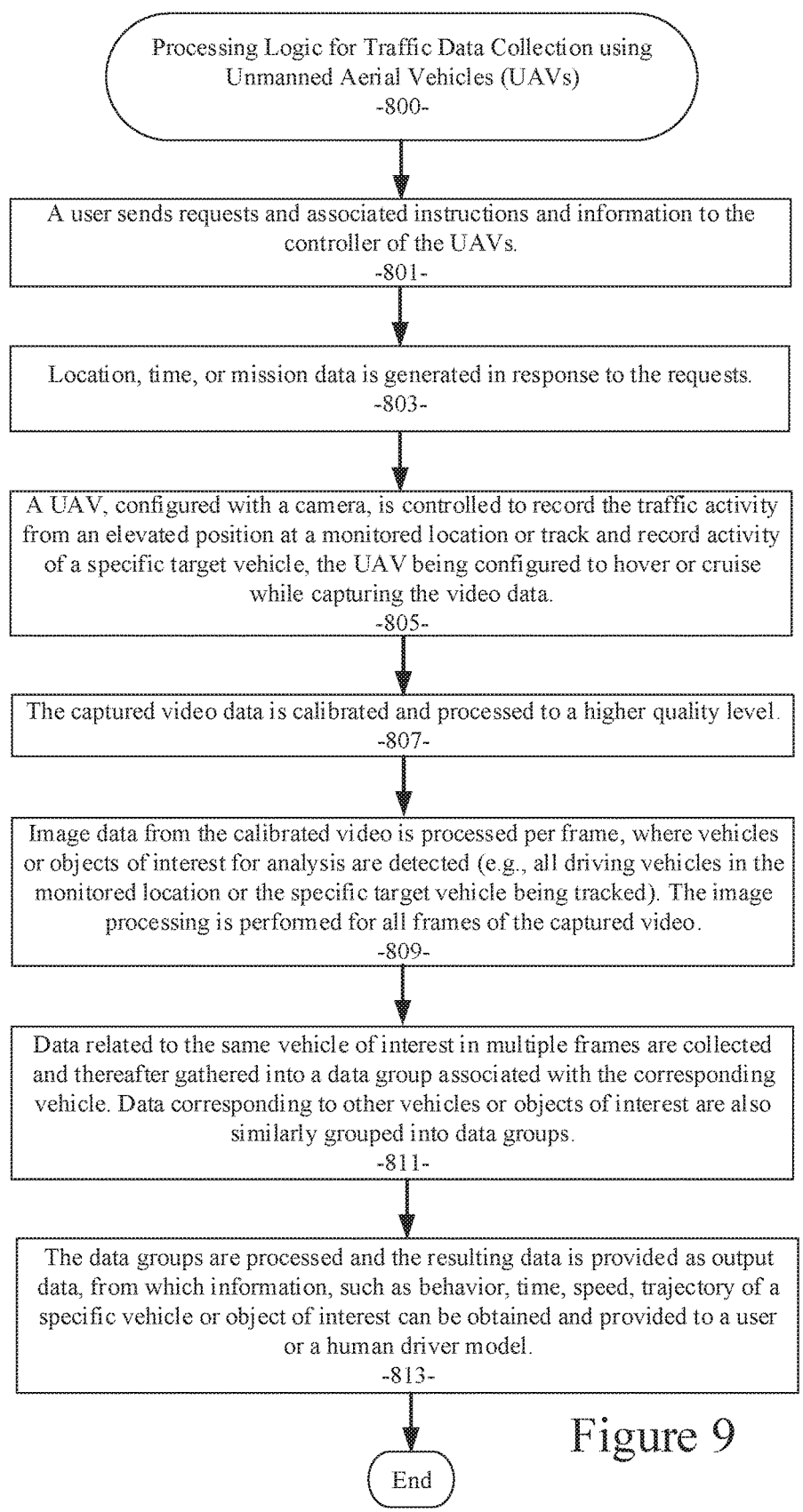
FIG. 9 illustrates a flow diagram showing an example embodiment of a system and method for traffic data collection using UAVs.

Referring now to FIG. 9, a flow diagram illustrates an example embodiment of a system and method 800 for traffic data collection using unmanned aerial vehicles (UAVs). The example embodiment can be configured as follows: A user sends requests and associated instructions and information to the controller of one or more UAVs (processing block 801). Location, time, or mission data is generated in response to the requests (processing block 803). In an alternative embodiment, the location, time, or mission data can be provided by a technician who is controlling the UAV. A UAV, configured with a camera, is controlled to record the traffic activity from an elevated position at a monitored location or track and record activity of a specific target vehicle, the UAV being configured to hover or cruise while capturing the video data (processing block 805). The captured video data is calibrated and processed to a higher quality or fidelity level (processing block 807). Image data from the calibrated video is processed per frame, where vehicles or objects of interest for analysis are detected (e.g., all driving vehicles in the monitored location or the specific target vehicle being tracked). The image processing is performed for all frames of the captured video (processing block 809). Data related to the same vehicle of interest in multiple frames are collected and thereafter gathered into a data group associated with the corresponding vehicle. Data corresponding to other vehicles or objects of interest are also similarly grouped into data groups (processing block 811). The data groups are processed and the resulting data is provided as output data, from which information, such as behavior, time, speed, trajectory of a specific vehicle or object of interest can be obtained and provided to a user (processing block 813). Additionally, the output data can be used to configure or train a human driver model for prediction or simulation of human driver behavior.

Figure 10:
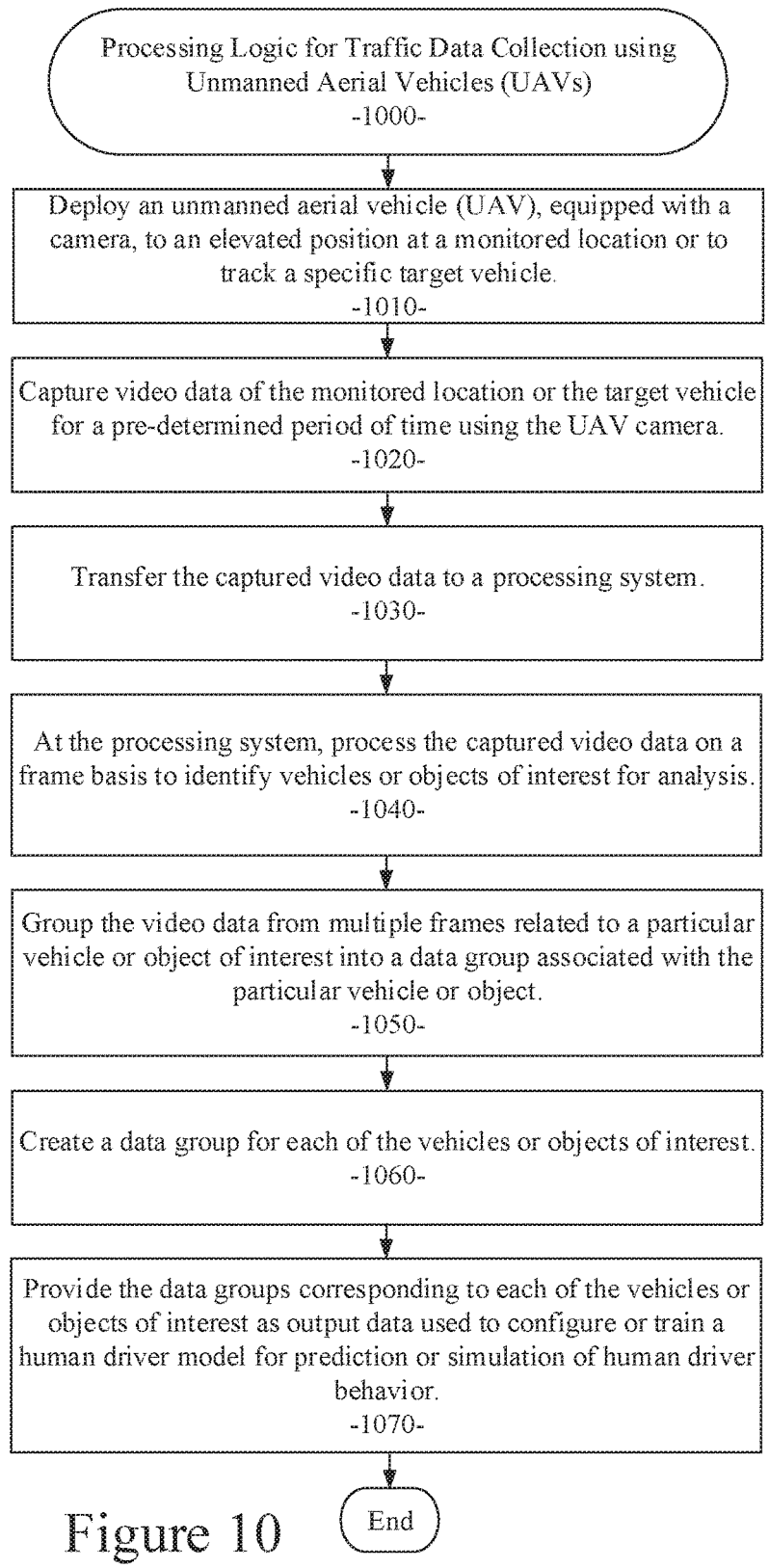
FIG. 10 is a process flow diagram illustrating an example embodiment of a system and method for traffic data collection using UAVs.

Referring now to FIG. 10, a flow diagram illustrates an example embodiment of a system and method 1000 for traffic data collection using unmanned aerial vehicles (UAVs). The example embodiment can be configured to: deploy an unmanned aerial vehicle (UAV), equipped with a camera, to an elevated position at a monitored location or to track a specific target vehicle (processing block 1010); capture video data of the monitored location or the target vehicle for a pre-determined period of time using the UAV camera (processing block 1020); transfer the captured video data to a processing system (processing block 1030); at the processing system, process the captured video data on a frame basis to identify vehicles or objects of interest for analysis (processing block 1040); group the video data from multiple frames related to a particular vehicle or object of interest into a data group associated with the particular vehicle or object (processing block 1050); create a data group for each of the vehicles or objects of interest (processing block 1060); and provide the data groups corresponding to each of the vehicles or objects of interest as output data used to configure or train a human driver model for prediction or simulation of human driver behavior (processing block 1070).

Figure 11:
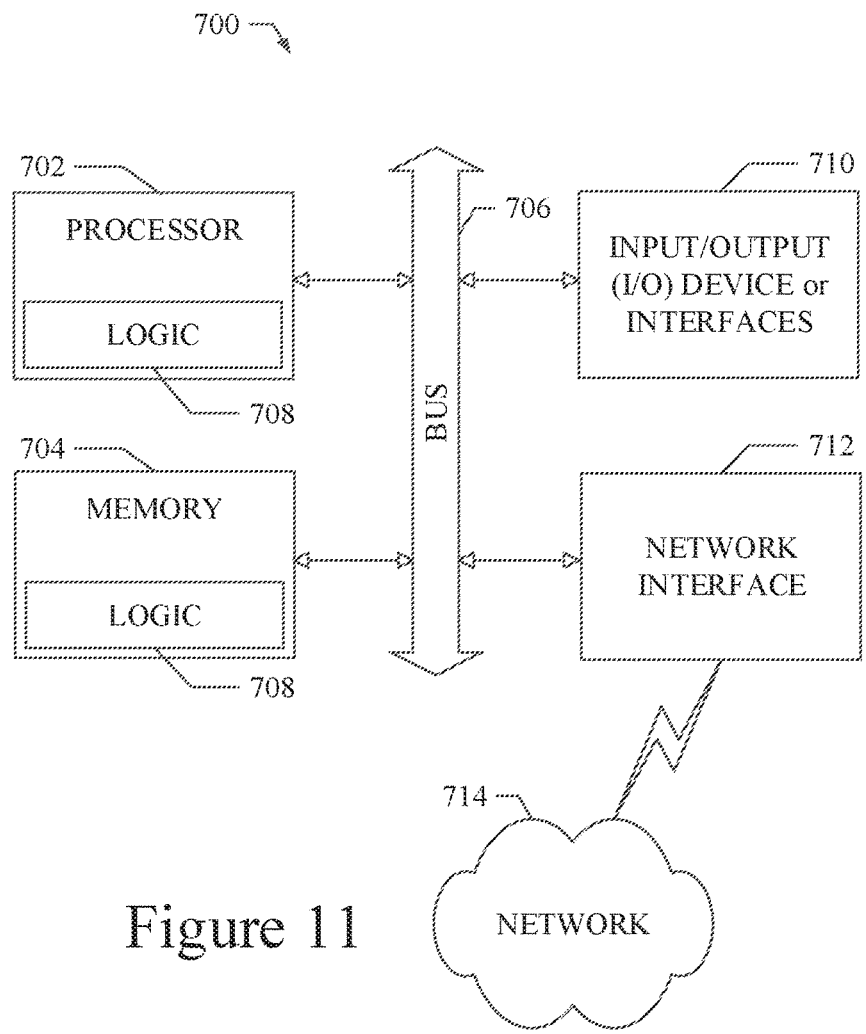
FIG. 11 shows a diagrammatic representation of machine in the example form of a computer system within which a set of instructions when executed may cause the machine to perform any one or more of the methodologies discussed herein.

FIG. 11 shows a diagrammatic representation of a machine in the example form of a computing system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example computing system 700 can include a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, a voice interface, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth™, IEEE 802.11x, and the like. In essence, network interface 712 may include or support virtually any wired and/or wireless communication and data processing mechanisms by which information/data may travel between a computing system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
    an unmanned aerial vehicle (UAV), equipped with a camera, positioned at an elevated position at a monitored location or to track a specific target vehicle, the UAV configured to capture video data of the monitored location or the target vehicle for a pre-determined period of time using the UAV camera;
    a data processor; and
    a human driver model module, executable by the data processor, the human driver model module being configured to:
        receive the captured video data from the UAV;
        process the captured video data on a frame basis to identify vehicles or objects of interest for analysis;
        group the video data from multiple frames related to a particular vehicle or object of interest into a data group associated with the particular vehicle or object;
        create a data group for each of the vehicles or objects of interest; and
        provide the data groups corresponding to each of the vehicles or objects of interest as output data used to configure or train a human driver model for prediction or simulation of human driver behavior.

2. The system of claim 1 wherein the human driver model includes machine learnable components.

3. The system of claim 1 wherein the UAV is configured to hover or cruise with the target vehicle.

4. The system of claim 1 wherein the human driver model is configured to retain information from the output data corresponding to human driver behaviors as mathematical or data representations.

5. The system of claim 1 wherein the human driver model is configured to predict or simulate human driver behaviors.

6. The system of claim 1 wherein the human driver model is indirectly used to configure a control system for an autonomous vehicle.

7. The system of claim 1 wherein the captured video data is received by the human driver model module in a wireless data transmission from the UAV.

8. The system of claim 1 wherein the captured video data is received by the human driver model module as a data transfer from a data storage device of the UAV.

9. A method comprising:
    deploy an unmanned aerial vehicle (UAV), equipped with a camera, to an elevated position at a monitored location or to track a specific target vehicle;
    capture video data of the monitored location or the target vehicle for a pre-determined period of time using the UAV camera;
    transfer the captured video data to a processing system;
    at the processing system, process the captured video data on a frame basis to identify vehicles or objects of interest for analysis;
    group the video data from multiple frames related to a particular vehicle or object of interest into a data group associated with the particular vehicle or object;
    create a data group for each of the vehicles or objects of interest; and
    provide the data groups corresponding to each of the vehicles or objects of interest as output data used to configure or train a human driver model for prediction or simulation of human driver behavior.

10. The method of claim 9 wherein the processing system includes machine learnable components.

11. The method of claim 9 wherein the UAV is configured to hover or cruise with the target vehicle.

12. The method of claim 9 wherein the human driver model is configured to retain information from the output data corresponding to human driver behaviors as mathematical or data representations.

13. The method of claim 9 wherein the human driver model is configured to predict or simulate human driver behaviors.

14. The method of claim 9 wherein the human driver model is used to configure a control system for an autonomous vehicle.

15. The method of claim 9 wherein the captured video data is received by the processing system in a wireless data transmission from the UAV.

16. The method of claim 9 wherein the captured video data is received by the processing system as a data transfer from a data storage device of the UAV.

17. A non-transitory machine-useable storage medium embodying instructions which, when executed by a machine, cause the machine to:
    receive captured video data from an unmanned aerial vehicle (UAV), equipped with a camera, positioned at an elevated position at a monitored location or to track a specific target vehicle, the UAV configured to capture video data of the monitored location or the target vehicle for a pre-determined period of time using the UAV camera;

process the captured video data on a frame basis to identify vehicles or objects of interest for analysis;

group the video data from multiple frames related to a particular vehicle or object of interest into a data group associated with the particular vehicle or object;

create a data group for each of the vehicles or objects of interest; and provide the data groups corresponding to each of the vehicles or objects of interest as output data used to configure or train a human driver model for prediction or simulation of human driver behavior.

18. The non-transitory machine-useable storage medium of claim 17 wherein the instructions are further configured to enable machine learning.

19. The non-transitory machine-useable storage medium of claim 17 wherein the instructions are further configured to retain information from the output data corresponding to human driver behaviors as mathematical or data representations.

20. The non-transitory machine-useable storage medium of claim 17 wherein the instructions are further configured to predict or simulate human driver behaviors.

* * * * *